US011449273B2

(12) United States Patent
Adler et al.

(10) Patent No.: US 11,449,273 B2
(45) Date of Patent: Sep. 20, 2022

(54) APPARATUS FOR STORING DATA IN A NON-VOLATILE MEMORY

(71) Applicant: PILZ GMBH & CO. KG, Ostfildern (DE)

(72) Inventors: Sven Adler, Ostfildern (DE); Christoph Zell, Ostfildern (DE)

(73) Assignee: Pilz GmbH & Co. KG, Ostfildern (DE)

( * ) Notice: Subject to any disclaimer, the term of this patent is extended or adjusted under 35 U.S.C. 154(b) by 0 days.

(21) Appl. No.: 17/209,844

(22) Filed: Mar. 23, 2021

(65) Prior Publication Data

US 2021/0349656 A1 Nov. 11, 2021

(30) Foreign Application Priority Data

Mar. 24, 2020 (DE) .................... 10 2020 108 101.4

(51) Int. Cl.
*G06F 3/06* (2006.01)

(52) U.S. Cl.
CPC .......... *G06F 3/0655* (2013.01); *G06F 3/0623* (2013.01); *G06F 3/0679* (2013.01)

(58) Field of Classification Search
CPC .... G06F 3/0604; G06F 3/0605; G06F 3/0608; G06F 3/0623; G06F 3/0626; G06F 3/064; G06F 3/0655; G06F 3/0679
USPC ............................ 710/52, 53; 711/110, 154
See application file for complete search history.

(56) References Cited

U.S. PATENT DOCUMENTS

| | | | | |
|---|---|---|---|---|
| 4,180,854 | A | 12/1979 | Walden et al. | |
| 5,864,713 | A * | 1/1999 | Terry | G06F 5/10 710/52 |
| 6,862,635 | B1 * | 3/2005 | Alverson | G06F 9/52 710/52 |
| 9,647,692 | B2 * | 5/2017 | Prodan | H04L 1/1874 |
| 2015/0347227 | A1 * | 12/2015 | Rabenalt | G06F 3/0679 714/764 |
| 2018/0054374 | A1 | 2/2018 | Chen | |

FOREIGN PATENT DOCUMENTS

| | | | |
|---|---|---|---|
| EP | 0489204 | A1 | 6/1992 |
| EP | 0489204 | B1 | 8/1995 |
| JP | H04290127 | | 10/1992 |
| JP | H0830220 | A | 2/1996 |
| JP | 2001195283 | A | 7/2001 |
| JP | 2005196591 | A | 7/2005 |
| JP | 2016028888 | A | 2/2018 |

* cited by examiner

*Primary Examiner* — Gary J Portka
(74) *Attorney, Agent, or Firm* — Miller Johnson

(57) ABSTRACT

An apparatus for storing data in a non-volatile memory includes a data processing unit and a memory unit. The data processing unit is configured to acquire data blocks, terminate each data block of the data blocks with a terminating element, and assemble the terminated data blocks into a serial data stream. The memory unit is configured to sequentially write the serial data stream to the non-volatile memory. The terminating element is variable between a first code word and a second code word. The data processing unit is configured to switch between using the first code word and the second code word as the terminating element in response to the non-volatile memory having been written to completely by the memory unit.

20 Claims, 4 Drawing Sheets

APPARATUS FOR STORING DATA IN A NON-VOLATILE MEMORY

CROSS-REFERENCE TO RELATED APPLICATIONS

This application claims priority to German Application No. 10 2020 108 101.4 filed Mar. 24, 2020, the entire disclosure of which is incorporated by reference.

FIELD

The present disclosure relates to an apparatus for storing data in a non-volatile memory and corresponding methods.

BACKGROUND

In information technology, non-volatile memories refer to data memories whose information is retained permanently—that is, even when the device that includes the memory is not in operation or the memory is no longer supplied with power. In contrast to volatile memories, such as main memory or the registers of a CPU, non-volatile memories are used to store configuration data, user profiles, passwords, certificates or other data that can be changed during operation and are retained after power-down to be used again after a restart.

For flexible and convenient access to the data in a non-volatile memory, it can be organized in a defined manner. The most common organizational structure is a file system, where one area of memory contains the actual payload data and another area contains a description of a structure that catalogs the partitioning of the payload data. A file system or other complex storage structure has the advantage that large amounts of data can be stored in a structured way and can be processed more easily. For example, file systems allow random access to the data as well as complex management structures such as directory trees in which the data can be organized.

However, as the complexity of the organizational structure of the memory increases, so does the effort required to access the memory. In addition, the organizational structure itself requires storage space that is no longer available for user data.

However, flexible and convenient access via a file system or other complex storage structure is not a priority for every application. For smaller systems, such as embedded systems that perform a dedicated task, other properties are important. For example, in the case of devices that record log and diagnostic data on non-volatile memories, it is important that the data can be stored safely, consistently and traceably in the non-volatile memory and that this can also be guaranteed in unstable situations (transaction safety). That is, data loss in the event of a power failure should be as small as possible and should not affect the overall consistency of the written data. At the same time, the additional effort required for this must not be too high in order to be feasible even for devices with low computing capacity and memory.

SUMMARY

It is an object to provide an apparatus and a corresponding method for storing data in a non-volatile memory, which can be easily implemented even in systems with low computing capacity and low memory. Further, it is an object to provide an apparatus and a corresponding method that ensure high transaction safety and inherent consistency of the stored data. Yet further, it is an object to ensure transaction safety and inherent consistency even in the event of a power failure.

According to an aspect of the present disclosure there is provided an apparatus for storing data in a non-volatile memory, comprising a data processing unit configured to acquire data blocks, terminate each data block of the data blocks with a terminating element, and assemble the terminated data blocks into a serial data stream, and a memory unit configured to sequentially write the serial data stream to the non-volatile memory, wherein the terminating element is variable between a first code word and at least one second code word, and the data processing unit is configured to switch between using the first code word and the second code word as the terminating element in response to the non-volatile memory having been written to completely by the memory unit.

According to a further aspect of the present disclosure, there is provided a method for storing data in a non-volatile memory. The method, comprising:

- acquiring data blocks;
- terminating each data block of the data blocks with a terminating element;
- assembling the terminated data blocks into a serial data stream;
- writing the serial data stream to the non-volatile memory;

wherein the terminating element is variable between a first code word and a second code word, and terminating the data blocks includes changing the use of the first code word and the second code word as the terminating element in response to the non-volatile memory having been written to completely.

According to a further aspect of the present disclosure, there is provided a method for reading data from a non-volatile memory. The method, comprising:

- reading a first sequential data stream from the non-volatile memory;
- locating a first code word and a second code word defining a transition in the first sequential data stream;
- setting an initial start position based on the detected transition;
- reading a second sequential data stream starting at the initial start position;
- splitting the second sequential data stream into data blocks based on the first code word or the second code word; and
- detecting a change between the first code word and the second code word in the second sequential data stream.

It is thus an idea of the present invention to write to the non-volatile memory sequentially without relying on an explicit organizational structure of the data memory for this purpose. Rather, it is an idea to impose an implicit organizational structure on the serial data stream, which is based on the abstract data type of a queue/FIFO.

The memory unit writes to the non-volatile memory sequentially. This has the advantage that all memory cells are written to equally. In this way, the maximum write cycles can be utilized for non-volatile memories that have a limited service life, such as flash memory. Without having to rely on methods such as wear-leveling, the memory can be optimally written to.

The serial data stream can also be easily used in serial protocols (e.g. RS232, Ethernet, etc.) without the need for additional computational effort for conversion and serialization. Thereby, the apparatus is suitable for embedded systems that have limited resources and no additional units for implementing communication protocols.

The data processing unit imprints the implicit organizational structure on the serial data stream with minimal additional effort. Depending on the application, one or two additional bytes per data block are sufficient to implement the implicit organizational structure. Together with the omission of an explicit organizational structure, the memory is utilized almost optimally.

In addition, the implicit organizational structure has the advantage of inherent consistency, i.e., the structure is intrinsically very robust and remains functional overall if individual memory cells are defective. Furthermore, the combination of sequential writing with the simple implicit organizational structure reduces the necessary program steps per write operation (transaction). Thereby, a high level of transaction safety can be ensured, which reduces data loss in the event of an unexpected power failure. The apparatus is thus highly suitable for storing safety-relevant log or diagnostic data, the recording of which is particularly important in the case of unstable states, e.g. in order to enable a controllable and seamless audit trail.

In a further refinement, the memory unit may be configured to sequentially address the non-volatile memory in order to write thereto completely in a sequential manner. The memory unit can write to the non-volatile memory without an explicit organizational structure.

By means of iterative addressing, the memory unit can easily and efficiently access the memory and realize sequential writing. Thus, the refinement contributes to a further reduction in the additional effort necessary for storing on the non-volatile memory.

In a further refinement, the memory unit may be configured to sequentially read the non-volatile memory, identify a change of the terminating element to determine an initial start position, and begin sequentially writing the serial data stream at the initial start position.

According to this refinement, the memory unit may first determine an initial start position, for example after a restart. Due to the implicit organizational structure, only a single sequential search run is necessary for this. The initial start position is the position after the terminating element of the last written element. The last element written can be identified from the sequentially read data by a transition from the first code word to the second code word or vice versa. An initial starting position can thus be determined quickly and efficiently. A reboot, which is frequently necessary in the case of embedded systems, can therefore be performed quickly and efficiently with essentially no loss of data.

In a further refinement, the memory unit may be configured to store a current writing position in a volatile memory.

By storing a current writing position, the memory unit can write new data to memory after a write pause without a prior search for the writing position. The current write position corresponds to a position after the terminating element of the last written element. Thereby, a write operation (transaction) can be executed particularly efficiently and with only a few operations, since the physical write to the memory can be started immediately.

In a further embodiment, the memory unit may be configured to store the current writing position in a volatile memory, and only if a value for the current writing position is available from the volatile memory, to write the serial data stream at the current writing position.

According to this embodiment, the memory unit continues a write operation at the current writing position only when a value for the current position can be obtained from the volatile memory. If no value is stored, the memory unit can determine an initial write position from the already stored data by a search and continue the write process at the position determined by the search. Storing the current position in a volatile memory thus enables continuous writing of the memory during operation and forces a search run only if the volatile memory has been reset, e.g. due to a restart. This refinement thus contributes to an increase in efficiency in a safe manner.

In a further refinement, the data processing unit may be configured to mask characters in the data blocks corresponding to the first code word or the at least second code word.

According to this refinement, it can be ensured that there are no characters in the data that correspond to the terminating elements and would thus lead to an inconsistency of the implicit organizational structure. Thereby, data can be stored independently of the choice of terminating elements, or the terminating elements can be chosen independently of the data to be stored.

In a further refinement, the data processing unit may be configured to generate a checksum for each data block of the data blocks and append it to the respective data block.

According to this refinement, each data block is thus provided with a checksum. The data can thus be easily secured against falsification without changing the implicit organizational structure. Thereby, the reliability of the data can be increased. The refinement thus specifically enables the apparatus to be uses as a log and diagnostic memory, which ensures a prober audit trail.

In a further refinement, the data processing unit may be configured to encrypt each data block of the data blocks.

According to this refinement, the data can be secured against manipulation and unauthorized access despite the lack of an explicit organizational structure. The refinement thus further enables the apparatus to be uses as a log and diagnostic memory.

In a further refinement, the data blocks may have a variable length.

The implicit organizational structure allows variable-length data to be stored without further modifications. Thereby, the available memory can be optimally utilized.

It goes without saying that the features mentioned above and those to be explained below can be used not only in the combination indicated in each case, but also in other combinations or on their own, without leaving the scope of the present invention.

BRIEF DESCRIPTION OF THE DRAWINGS

Embodiments of the invention are shown in the drawings and are explained in more detail in the following description.

DETAILED DESCRIPTION

Figure 1:
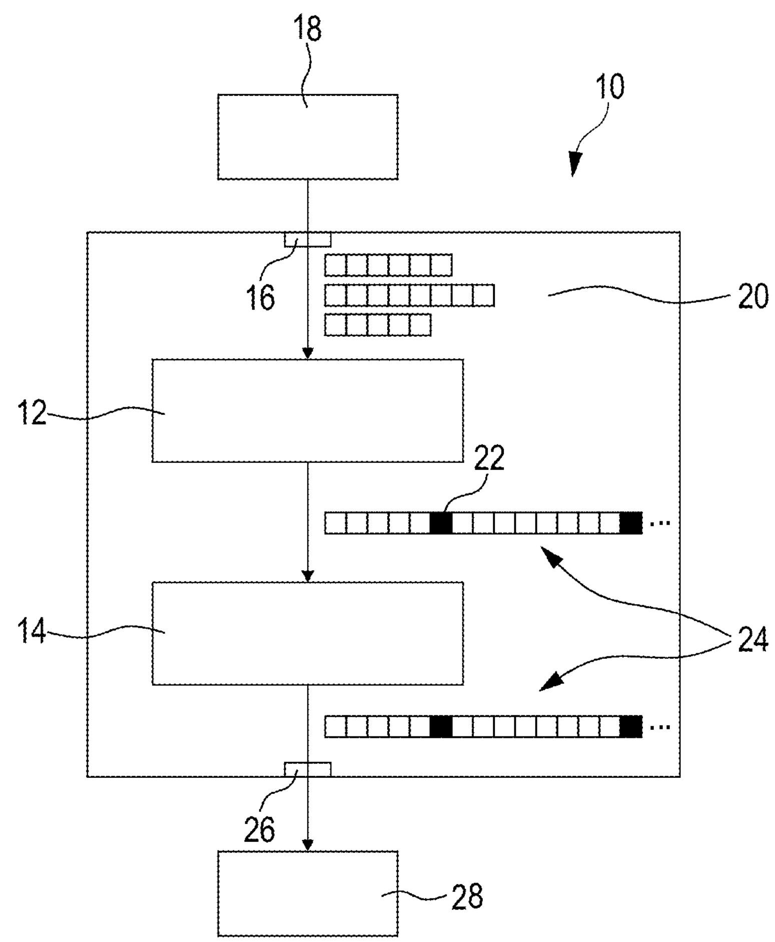
FIG. 1 is a schematic view of an apparatus for storing data in a non-volatile memory.

FIG. 1 shows an embodiment of an apparatus for storing data in a non-volatile memory. The apparatus is denoted here in its entirety by reference numeral 10.

The apparatus may be an embedded system, i.e. a data processing device that is integrated (embedded) in a technical context. Embedded systems can perform monitoring, control or regulation functions and provide the necessary data processing. For example, the apparatus can be a safety-related device that performs or is involved in the performance of a safety function.

The apparatus includes a data processing unit 12 and a memory unit 14. The units are to be understood as logical units and may be combined into a single computing unit. The computing unit may be a central processing unit, such as a microcontroller, which may have further peripheral functions in addition to a processor.

The data processing unit 12 may receive and process data blocks 20 from a data acquisition device 18 via a first interface 16. Staying with the example of the safety-related device, the data acquisition device 18 may be a diagnostic unit that acquires log and diagnostic data and sends them to the data processing unit 12 as messages in form of data blocks 20. The messages can include texts, measured values or other parameters. The data blocks 20 may be variable in length.

The data processing unit 12 acquires the individual data blocks 20 and appends a terminating element 22 to each data block. The terminating element 22 may be a defined symbol sequence, such as a single byte or a defined byte sequence. After terminating the data blocks 20, the data processing unit 12 assembles the terminated data blocks into a serial data stream 24. The serial data stream is thus a sequence of the data blocks, each separated by the terminating element 22.

The data blocks may be modified by the data processing unit to make the data blocks 20 free of characters corresponding to the terminating elements 22.

The memory unit 14 is connected to a non-volatile memory 28 via a second interface 26. The memory unit 14 sequentially writes to the non-volatile memory to store the serial data stream 24 in the non-volatile memory 28. The memory unit 14 does not use or rely on an explicit organizational structure of the non-volatile memory, such as a file system. Rather, the memory unit 14 may directly write to individually addressable memory locations of the non-volatile memory 28. Thus, the memory unit 14 treats the non-volatile memory as a RAW device, i.e., as a character-oriented device that allows direct access to its contents at the character level and does not abstract the stored data via a file system. Accordingly, the procedure differs from a method known as RAW mode for backing up proprietary data, in which the proprietary content is stored as raw data in files of a file system.

In principle, however, it is also conceivable to use a file system. Advantageously, the method can thus be applied uniformly to various embodiments of the non-volatile memory.

The memory unit 14 continues to write to the non-volatile memory 28 with the serial data stream 24 until the memory no longer has any free memory area, i.e. the memory has been completely written to. Once this point is reached, the data processing unit 12 changes the terminating element 22 and henceforth generates the serial data stream 24 with a different sequence of symbols as the terminating element 22. The data processing unit 12 can thus switch between a first code word and at least one second code word as the terminating element 22, wherein the switch occurs whenever the memory has been completely written to.

After the change of the terminating element 22, the memory unit 14 starts to sequentially write the serial data stream to the non-volatile memory 28 from the beginning. The memory unit 14 thus overwrites the data previously stored in the non-volatile memory 28. When overwriting, the memory unit 14 may starts with the data that has been written first. The memory unit 14 thus uses the non-volatile memory 28 like a ring buffer.

By creating the serial data stream and writing sequentially in the manner previously described, an organizational structure is imposed on the nonvolatile memory that can ensure the following characteristics:

- uniform writing to all memory cells;
- inherent consistency of the data structure;
- high transaction safety even in case of power failure without special precautions;
- no data loss of written data;
- optimal utilization of the storage due to only a minor additional effort for the organization of the data;
- reusability of the serial data stream in serial communication protocols, such as RS232 or Ethernet.

The memory process and the implicit organizational structure are explained in more detail below with reference to FIG. 2.

Figure 2:
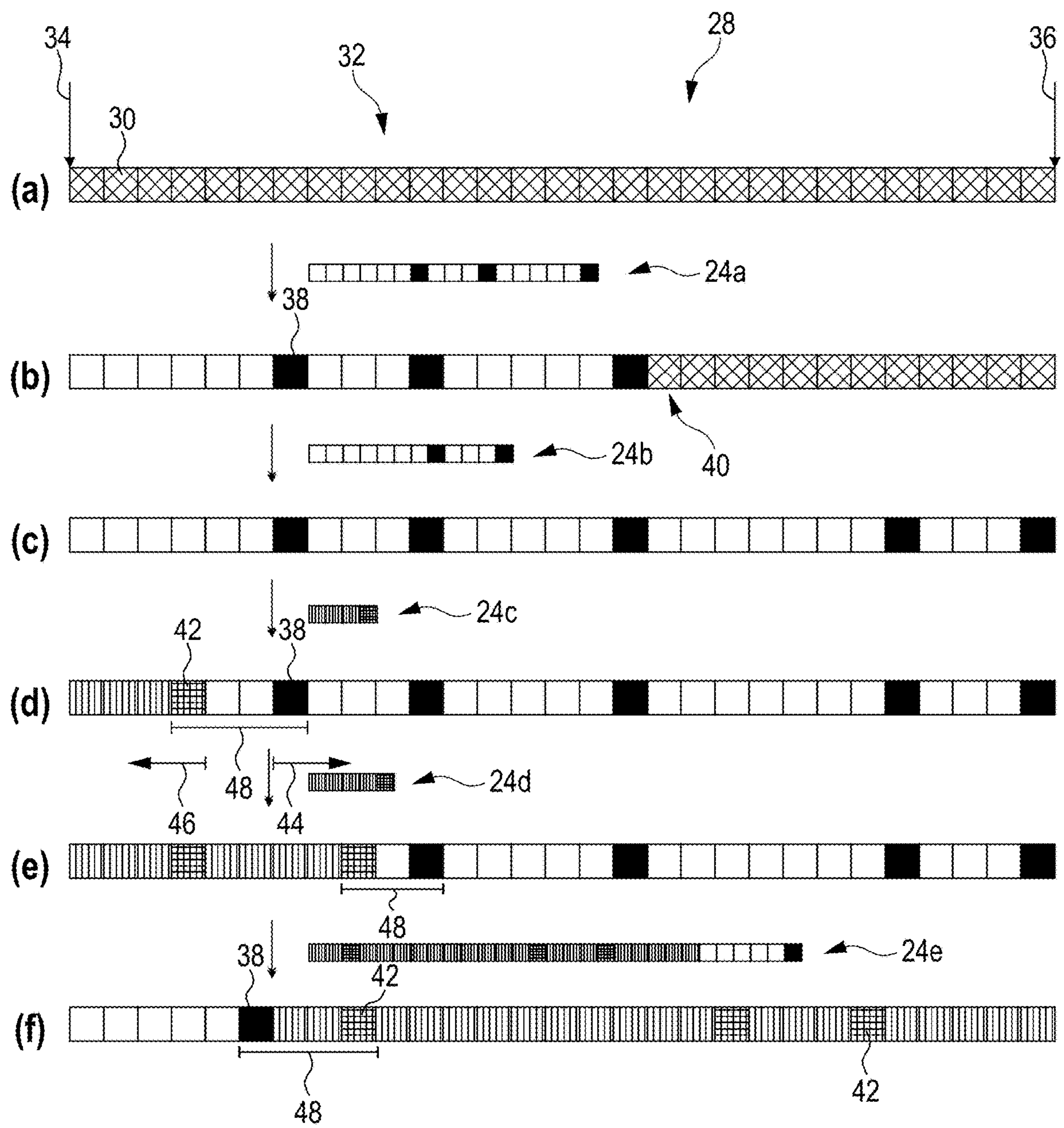
FIG. 2 is a schematic view of a write operation to the non-volatile memory.

FIG. 2 illustrates the write operation in a schematic view of a non-volatile memory.

The top illustration (a) in FIG. 2 shows the non-volatile memory 28 in an unwritten state. The non-volatile memory 28 is indicated here, for example, by twenty-nine memory cells. A single memory cell 30 may store a single byte in this example. Thus, in this example, the non-volatile memory 28 has a memory area 32 comprising twenty-nine bytes. It is understood that this example is for illustrative purposes only. In fact, the non-volatile memory can be much larger than shown here. Furthermore, it is also conceivable that only part of the total physical memory is used. Segmentation or storage of multiple lists (in one physical memory) is thus possible.

The memory area 32 has a start position 34 and an end position 36 indicating the first and last memory cells of the memory area 32. The memory area 32 may comprise all of the memory provided by the non-volatile memory 28. The non-volatile memory 28 may further be unformatted and, consequently, may not have an explicit organizational structure in which certain memory cells are reserved for the organization of the memory, such as for a description of a structure or an allocation table.

Illustration (b) shows the non-volatile memory 28 after the memory unit 14 has sequentially written a first segment 24*a* of the serial data stream 24 into it. Initially, the memory unit 14 starts writing at the start position 34 after the code word 38. The individual data blocks are terminated in the serial data stream 24 with the first code word 38. The memory unit 14 may further store in an internal memory the current writing position 40. The current writing position 40 may, for example, point to the next memory cell that has not yet been written to. It goes without saying that the present writing position may also be stored in other ways.

In illustration (c), the memory unit 14 has written another segment 24*b* of serial data stream 24 into the non-volatile memory 28. At this point, the memory unit 14 has reached the end position 36 of the non-volatile memory 28.

As soon as the memory unit 14 has reached the end position 36, i.e. has written to the memory area 32 from beginning to end, the memory unit 14 starts writing to the memory area 32 from the beginning. In other words, the memory unit 14 writes the next value of the serial data stream to the start position 34 of the memory area 32 and overwrites the value added first. At the same time, the terminating element 22 changes and the data blocks are henceforth terminated with the second code word 42.

Illustration (d) shows the non-volatile memory 28 after another segment 24*c* of serial data stream 24 has been written into the memory. The change of the terminating element 22 is apparent from the use of the second code word 42. To illustrate the overwriting, the user data has been marked here by vertical lines. However, the user data is coded in the same way as the user data before, which has been indicated by the empty boxes. Only the terminating element 22 has changed and is now the second code word 42.

The area between the two code words 38 and 42 is invalid.

Illustration (e) shows the writing of another segment 24*d* to the non-volatile memory 28. The memory unit 14 overwrites the memory sequentially. Doing so, the code blocks are terminated with the second code word 42 as the terminating element 22.

Illustration (f) shows a state of the non-volatile memory 28 at which the write of the serial data stream 24 has again reached the end position 36 of the memory area 32. When the end position is reached, the terminating element 22 is changed again and is now again the first code word 38. If the data blocks of the segment 24*e* of the serial data stream 24 were terminated with the second code word 42 until the end position 36 was reached, they are now terminated with the first code word 38. At the same time, when the end position 36 is reached, the memory unit 14 starts overwriting the memory area 32 again from the start position 34.

The process shown in illustration (b) to (f) repeats continuously and the memory area 32 is written to in a circular manner like a ring buffer. The terminating element is exchanged with each rotation.

After the first cycle, the memory area 32 is thus divided into a first area 44 and a second area 46. In the first area 44, the data blocks are terminated with the first code word 38, and in the second area 46, the data blocks are terminated with the second code word 42. A transition 48 between the regions 44, 46 is indicated by a change in the terminating element 22. For example, in illustrations (d) and (e), the transition 48 occurs upon a change from the second code word 42 to the first code word 38 when the memory area 32 is viewed from the start position 34. In illustration (f), the change occurs at the transition 48 from the first code word 38 to the second code word 42 when the memory area 32 is viewed from the start position 34.

The beginning of the transition 48 is the head of the queue, the end of the transition 48 is the tail of the queue.

The transition 48 may be used to determine an initial writing position. For example, the memory unit 14 may be configured to first determine an initial writing position after a restart in order to continue the write operation at that position. If data has been previously written to the non-volatile memory 28, the write operation may be started at the transition 48 rather than at the start position 34. Thus, the consistency of the previously written data may be maintained and the written data may be completely and consistently available after a system restart.

The memory unit 14 may sequentially read out the memory area 32 for the search and identify a transition 48. Subsequently, the memory unit 14 may continue the write operation at the location of the transition 48, more specifically after the first terminating element in the region of the transition 48, by the memory unit 14 storing the initial start position as the current writing position, for example, after finding the initial start position.

The search is not limited to the time after a system restart, but can also be performed at another time as well. A search may be initiated, for example, if a current writing position stored in the memory unit 14 becomes invalid. Before this leads to an inconsistent memory image, the integrity can be maintained with a new search.

Figure 3:
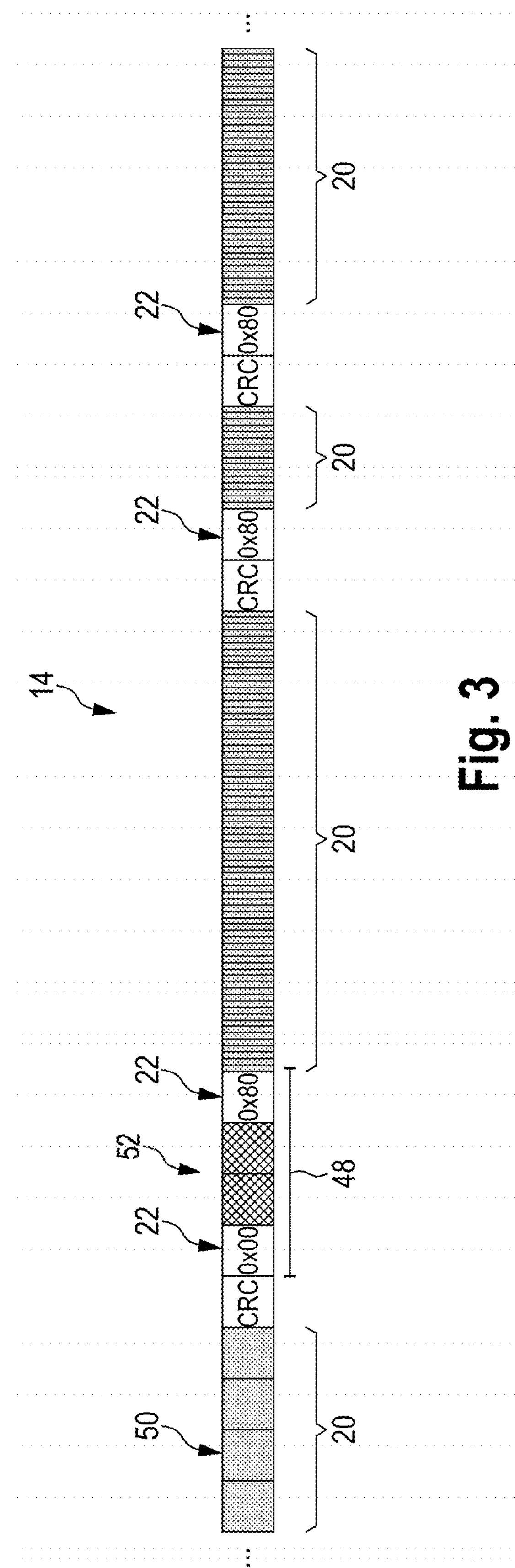
FIG. 3 is a schematic view of a serial data stream according to various implementations.

FIG. 3 shows a schematic view of a serial data stream 24 according to a preferred embodiment.

The serial data stream 24 is composed of a plurality of contiguous data elements 50 stored in successive memory cells 30. The user data is grouped into data blocks 20, which are separated from each other by terminating elements 22. Here, the terminating elements 22 are each code words having a length of one byte. For example, the first code word 38 is "0x00" and the second code word 42 is "0x80". It will be understood that in other embodiments, the code word is not limited to a single byte, but may include a plurality of characters.

In the embodiment shown here, the user data is additionally secured. Each data block is extended by a cyclic redundancy check digit (CRC) to protect the data of the respective data block against corruption or transmission errors. Cyclic redundancy checking can be used to further increase the inherent consistency of the implicit organizational structure imposed on the serial data stream. The redundancy check digit is also not limited to a single byte.

In addition, the user data may also be encrypted within the data blocks 20. This is indicated in FIG. 3 by the grey background of the data fields. In addition to manipulation protection, unauthorized access to the user data can be prevented in this way.

CRC and encryption can be used to enhance the implicit organizational structure in a simple way. Thereby, a high level of data integrity even with the simple organizational structure can be ensured.

Reference numeral 48 indicates a transition in FIG. 3. The transition 48 marks an area in which a change in the used terminating element 22 occurs. The transition 48 occurs because the memory area is written to circumferentially like a ring buffer. In other words, when the available memory area has been completely written to, it will start over at the beginning of the memory area and overwrite the previous data. Sequential writing to a ring buffer implies that the oldest data is overwritten first. This is advantageous for storing log and diagnostic data in chronological order. In this way, the memory area can be optimally utilized to store the most current messages to the greatest extent.

In addition, by writing to the memory evenly, an optimum service life of the memory can be achieved. The organizational structure resides in the data stream. Reading and writing sequentially results in the memory being accessed evenly.

According to the proposed implicit organizational structure, almost all the available memory can be used for the user data. Only the terminating elements and, if applicable, the CRC check digit require additional memory space. However, this may be limited to one or two bytes per data block.

Apart from the area 52 between the two terminating elements in the transition 48 (indicated here by the cross-hatched data blocks), the entire memory area is occupied by valid user data which can be broken down again into the original data blocks, for example into the individual diagnostic messages, by sequential reading and splitting at the terminating elements 22. The implicit organizational structure is thus particularly suitable for storing messages that follow one another in time, but is not limited to such data.

In addition to making optimum use of the memory area of the non-volatile memory 28, storing the serial data stream also has the advantage that the data stream can be used directly in a serial data transmission. For transmission by means of a serial protocol, it is sufficient to read out the data stream sequentially and unchanged from the memory. Consequently, the serial data stream does not have to be compiled separately for transmission. The requirement for computing power or a buffer memory of the computing unit used can thus be reduced.

Figure 4:
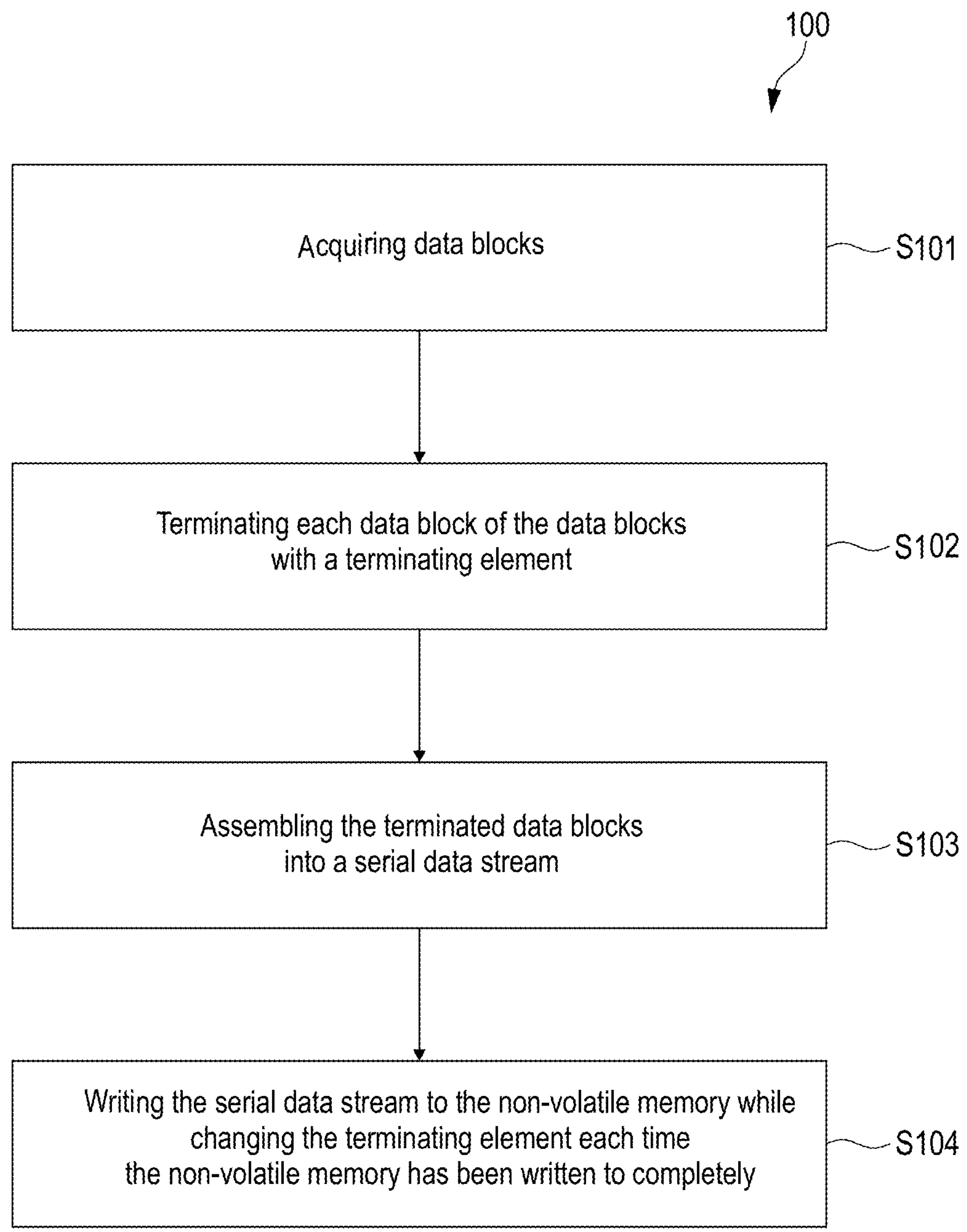
FIG. 4 is a schematic representation of a method for storing data in a non-volatile memory.

FIG. 4 summarizes in a schematic diagram the method steps of a method for storing data in a non-volatile memory according to an embodiment of the present disclosure. The method is denoted in its entirety by reference numeral 100.

In step S101, a data processing unit acquires individual data blocks 20. The data blocks 20 may be, for example, diagnostic messages of variable length from a diagnostic device. The data blocks 20 may be transmitted to the data processing unit or actively acquired by reading from a shared memory.

Each data block of the acquired data blocks is provided with a terminating element by the data processing unit in step S102. In this regard, the data processing unit may select between a first terminating element and at least one second terminating element to allow for implicit organization in subsequent data sequencing. Optionally, the data processing unit may process the data during this step, for instance, by masking in the data characters used for the terminating elements. Furthermore, it is conceivable to provide the data at this point with a checksum or to encrypt it.

Then, the data processing unit assembles the terminated data blocks into a serial data stream in step S103 by queuing the blocks together. In a preferred embodiment, the data processing unit may assemble the data blocks temporally according to their reception by the data processing unit. However, it is also conceivable that the data processing unit 12 first sorts and prioritizes the data blocks and then assembles them to form the serial data stream.

In step S104, the serial data stream is written to the non-volatile memory, i.e., the data is physically stored in the non-volatile memory. Writing to memory is done sequentially. For example, the serial data stream can be transferred byte by byte into the non-volatile memory or in blocks of a defined size. Addressing of the memory can be done by a simple iterator, so that only a pointer to the current writing position has to be incremented. This can be done without the aid of an operating system and can also be implemented on microcontrollers with limited resources.

The writing in step S104 corresponds to a writing into a ring buffer. When the memory has been completely written to, the write operation continues from the beginning of the memory. In addition, the terminating element is changed when the end of the memory is reached. In other words, after each cycle, the terminating element that separates the data blocks varies. In this way, the implicit organizational structure described above is realized.

It will be understood that the method is not limited to the steps shown herein, but may include additional steps or intermediate steps. The method can be implemented by the previously described apparatus. Alternatively, the method may be implemented as a computer program that enables a computer or other computing device (ASIC, FPGA, etc.) to execute the method.

In addition to the method for storing the data, the storage apparatus may also implement a corresponding method for reading the data. This procedure can also be implemented by another device, e.g. a commercially available PC.

A reading procedure is divided into two phases. First, an initial read position is determined and then, starting from the initial read position, the memory is read sequentially. The first phase corresponds to the procedure for finding the initial writing position. Here, the memory is read sequentially and a transition from one code word to another is identified in the sequentially read data. The end of the transition marks the initial read position from which the sequential readout is started. The data read sequentially from the reading position can be broken down into the individual data blocks using the terminating elements, which can then be processed in a manner known per se.

A reading procedure may include the following steps:

reading a first sequential data stream from a non-volatile memory;

detecting a first code word and a second code word defining a transition in the first sequential data stream;

setting an initial start position based on the detected transition;

reading a second sequential data stream starting at the initial start position;

splitting the second sequential data stream into data blocks based on the first code word or the second code word;

detecting a change between the first code word and the second code word in the second sequential data stream.

The readout of the second sequential data stream is performed in a rolling manner, i.e., when the end of the non-volatile memory is reached, the read operation is continued at the beginning of the non-volatile memory.

It is understood that the description is to be understood as an example only and the features disclosed herein do not limit the scope of the disclosure. Rather, the scope of this invention is determined by the appended claims.

The term non-transitory computer-readable medium does not encompass transitory electrical or electromagnetic signals propagating through a medium (such as on a carrier wave). Non-limiting examples of a non-transitory computer-readable medium are non-volatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

As used herein, the phrase at least one of A, B, and C should be construed to mean a logical (A OR B OR C), using a non-exclusive logical OR, and should not be construed to mean "at least one of A, at least one of B, and at least one of C.

What is claimed is:

1. An apparatus for storing data in a non-volatile memory, comprising:

a data processing unit configured to:

acquire data blocks, terminate each data block of the data blocks with a terminating element, and assemble the terminated data blocks into a serial data stream; and a memory unit configured to sequentially write the serial data stream to an area of the non-volatile memory defined by a start position and an end position, wherein the terminating element is variable between a first code word and a second code word, and wherein the data processing unit is configured to switch between using the first code word and the second code word as the terminating element in response to the memory unit reaching the end position of the non-volatile memory while writing the serial data stream.

2. The apparatus according to claim 1, wherein the memory unit is configured to sequentially address the non-volatile memory from the start position to the end position.

3. The apparatus according to claim 2, wherein the non-volatile memory is a non-volatile memory without an explicit organizational structure.

4. The apparatus according to claim 1, wherein the memory unit is configured to:

sequentially read the non-volatile memory, identify a change of the terminating element to determine the start position, and start sequentially writing the serial data stream at the start position.

5. The apparatus according to claim 1, wherein the memory unit is configured to store a current writing position.

6. The apparatus according to claim 5, wherein the memory unit is configured to:

store the current writing position in a volatile memory, and in response to a value for the current writing position being available from the volatile memory, write the serial data stream at the current writing position.

7. The apparatus according to claim 6, wherein the memory unit is configured to write the serial data stream at the current writing position only in response to a value for the current writing position being available from the volatile memory.

8. The apparatus according to claim 1, wherein the data processing unit is configured to mask, in the data blocks, characters corresponding to at least one of the first code word and the second code word.

9. The apparatus according to claim 1, wherein the data processing unit is configured to mask, in the data blocks, characters corresponding to both the first code word and the second code word.

10. The apparatus according to claim 1, wherein the data processing unit is configured to generate a checksum for each data block of the data blocks and to append the checksum to the respective data block.

11. The apparatus according to claim 1, wherein the data processing unit is configured to encrypt each data block of the data blocks.

12. The apparatus according to claim 1, wherein the data blocks have a variable length.

13. A method of storing data in a non-volatile memory, comprising:

acquiring data blocks;

terminating each data block of the data blocks with a terminating element;

assembling the terminated data blocks into a serial data stream; and writing the serial data stream to an area of the non-volatile memory defined by a start position and an end position, wherein the terminating element is variable between a first code word and a second code word, and wherein terminating the data blocks includes changing use of the first code word and the second code word as the terminating element in response to reaching the end position of the non-volatile memory while writing the serial data stream.

14. A method of reading data from a non-volatile memory, comprising:

reading a first sequential data stream from the non-volatile memory;

locating a first code word and a second code word defining a transition in the first sequential data stream;

setting an initial start position based on the transition;

reading a second sequential data stream starting at the initial start position;

splitting the second sequential data stream into data blocks based on at least one of the first code word and the second code word; and detecting a change between the first code word and the second code word in the second sequential data stream.

15. The apparatus according to claim 1, wherein the area of the non-volatile memory is a proper subset of the non-volatile memory.

16. The apparatus according to claim 1, wherein the memory unit is configured to, in response to reaching the end position of the non-volatile memory while writing the serial data stream, continue writing the serial data stream beginning at the start position.

17. The apparatus according to claim 16, wherein continuing to write the serial data stream beginning at the start position includes overwriting previously written data beginning at the start position.

18. The method according to claim 13, wherein the area of the non-volatile memory is a proper subset of the non-volatile memory.

19. The method according to claim 13, further comprising, in response to reaching the end position of the non-volatile memory while writing the serial data stream, continuing to write the serial data stream beginning at the start position.

20. The method according to claim 19, wherein the continuing to write the serial data stream beginning at the start position includes overwriting previously written data beginning at the start position.

* * * * *